UNITED STATES PATENT OFFICE.

ARTHUR H. KRIEGER, OF LOS ANGELES, CALIFORNIA.

MOLDED ARTICLE AND PROCESS OF MAKING THE SAME.

1,076,126. Specification of Letters Patent. Patented Oct. 21, 1913.

No Drawing. Application filed March 5, 1913. Serial No. 752,214.

*To all whom it may concern:*

Be it known that I, ARTHUR H. KRIEGER, a citizen of the United States, residing at Los Angeles, in the county of Los Angeles and State of California, have invented a new and useful Molded Article and Process of Making the Same, of which the following is a specification.

This invention relates to bricks or blocks or molded articles such as are used in buildings or other structures, and the main object of the invention is to provide a composition for such purposes which will be extremely light and yet present sufficient strength for ordinary purposes.

Another object of the invention is to provide a molded article for such purpose which will be resistant to heat.

The combination constituting my present invention has many other advantages, being waterproof and practically sound proof, that is to say, it acts as a deadener of sound.

The article constituting the present invention consists of kieselguhr cemented or bound together into a coherent mass, for example, in the form of a brick or block, by the action of heat.

The material, kieselguhr, which forms the basis of my bricks or blocks or molded articles, said material being otherwise known as infusorial earth or diatomaceous earth, is found in large quantities in the western part of the United States, particularly in California, and on account of its extreme low specific gravity, provides a material which is adapted to make a brick or block of extreme lightness. Such light bricks or blocks are desirable for building purposes in that they reduce the weight of the walls, floors, etc., and correspondingly reduce the strains on the supporting parts. The native kieselguhr has but little coherence, being of extremely friable and loose nature, so that it is not adapted for use as such in the construction of building materials. I have found, however, that by means of the process hereinafter described, kieselguhr can be formed into coherent tenacious masses suitable for building blocks, bricks or other molded articles. The kieselguhr in its natural state contains considerable moisture and it is usually air-dried before shipment and it is the air-dried kieselguhr of commerce that is preferably utilized in my invention.

According to my invention the kieselguhr is crushed to a suitable degree of fineness, for example, to the fineness of coarse sand and is mixed with sufficient water to form a plastic mass capable of retaining its form when molded. The wet or moist kieselguhr is then molded into the desired form of brick, block or other article, and the resulting molded articles are dried in any suitable manner, for example, by air-drying. The air-dried molded articles formed as above described are then subjected to the action of heat in a suitable kiln or furnace, the heat applied being substantially the same as that which is used in burning ordinary brick, and the result of such heat being to cause partial or incipient fusion or fritting together of the contacting parts of the kieselguhr, so as to form the molded articles into a coherent tenacious mass, the amount of heat applied, however, being insufficient to reduce materially the porosity of the mass.

The brick, block or molded article formed as above described is extremely light, its lightness being due not only to the intrinsic lightness of the kieselguhr, but to the more or less porous nature of the article, the porosity being retained by the process as above described. The density or specific gravity of the article will, however, depend not only on the amount of heat used, but on the degree of fineness to which the kieselguhr is crushed. By crushing the kieselguhr to a state of finer division, for example, to the condition of fine sand, a denser, heavier and more compact article will be produced, whereas by using the kieselguhr in a coarser state of division, the article may be lighter and more porous. It will be understood, however, that the greater porosity and lightness will be accompanied in general by less tenacity, so that the conditions for which the article is to be used will determine the coarseness or fineness of crushing of the kieselguhr and the degree of heat used in burning.

In some cases it is desirable to use a mixture of different crushings or screenings of kieselguhr of different coarseness, for example, a satisfactory brick for some purposes may be made by mixing relatively coarse pieces of kieselguhr with kieselguhr which has been crushed to a condition of sand.

The molded article formed as above described is heat resistant, waterproof in the sense that it is not affected by water, and is an efficient sound deadener, as well as a highly efficient heat insulator.

What I claim is:

1. A molded article consisting of kieselguhr having its particles fritted and bound together by partial fusion of the kieselguhr.

2. A molded article consisting of a porous mass of kieselguhr having its constituent parts bound together by partial fusion of the parts in contact.

3. The process of making a molded article consisting in mixing divided kieselguhr with water to form a plastic mass, molding the same to the required shape, drying the molded mass and heating the dried product to a temperature sufficient to cause partial fusion of the contacting parts of the mass to bind said parts together.

In testimony whereof, I have hereunto set my hand at Los Angeles, California, this 21st day of February, 1913.

ARTHUR H. KRIEGER.

In presence of—
WM. DIETERLE,
A. P. KNIGHT.